(12) United States Patent
Hall

(10) Patent No.: US 11,562,661 B2
(45) Date of Patent: Jan. 24, 2023

(54) ABSOLUTE TEACHING DEVICE

(71) Applicant: Sheila Hall, Warren, MI (US)

(72) Inventor: Sheila Hall, Warren, MI (US)

( * ) Notice: Subject to any disclaimer, the term of this patent is extended or adjusted under 35 U.S.C. 154(b) by 0 days.

(21) Appl. No.: 17/149,657

(22) Filed: Jan. 14, 2021

(65) Prior Publication Data

US 2022/0366807 A1    Nov. 17, 2022

(51) Int. Cl.
*G09B 9/00* (2006.01)
*G06F 3/0482* (2013.01)
*G06F 3/01* (2006.01)
*G06T 19/20* (2011.01)

(52) U.S. Cl.
CPC ............. *G09B 9/00* (2013.01); *G06F 3/011* (2013.01); *G06F 3/0482* (2013.01); *G06T 19/20* (2013.01); *G06T 2200/24* (2013.01); *G06T 2219/2008* (2013.01)

(58) Field of Classification Search
CPC ......... G09B 9/00; G06F 3/011; G06F 3/0482; G06T 19/20; G06T 2200/24; G06T 2219/2008
See application file for complete search history.

(56) References Cited

U.S. PATENT DOCUMENTS

| | | | |
|---|---|---|---|
| 9,945,672 B2 | 4/2018 | Balasubramanian et al. | |
| 10,244,985 B1 | 4/2019 | Sayani et al. | |
| 10,303,851 B2 | 5/2019 | Nguyen et al. | |
| 10,513,725 B2 | 12/2019 | Leung et al. | |
| 10,610,144 B2 | 4/2020 | Eldardiry et al. | |
| 2014/0022283 A1* | 1/2014 | Chan | G06F 3/147 345/633 |
| 2016/0143699 A1* | 5/2016 | Tanji | A61B 34/20 600/431 |
| 2018/0177426 A1 | 6/2018 | Xu | |
| 2018/0235480 A1 | 8/2018 | Olivier | |
| 2018/0374582 A1 | 12/2018 | Holmes et al. | |
| 2020/0065438 A1 | 2/2020 | Yi et al. | |
| 2020/0275976 A1* | 9/2020 | McKinnon | G06N 5/003 |

* cited by examiner

*Primary Examiner* — Chong Wu

(57) ABSTRACT

An illustrated view of an absolute teaching device for presenting an image of the patient's medical information to the doctor. The absolute teaching device is useful to aid to educate the patient or to close a mode of a treatment plan. The absolute teaching device removes the blood and gut, that most non-healthcare individuals can be squeamish about by animating with transparencies to see from frontal to supine. The absolute teaching device may highlight, or glow, for areas of concern during a consultation and direct any other areas of concern related to the origin of concern.

14 Claims, 4 Drawing Sheets

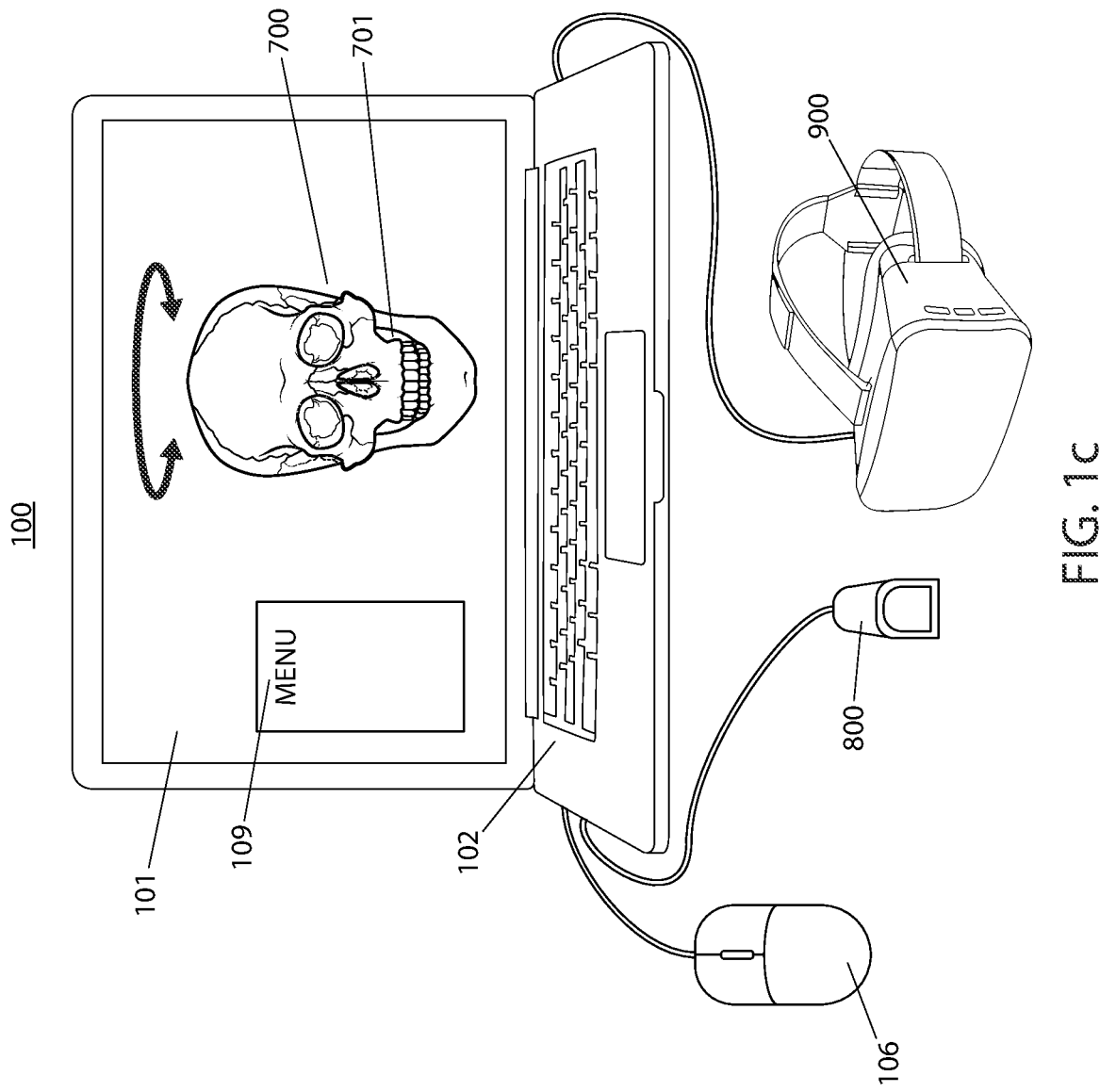

ABSOLUTE TEACHING DEVICE

FIELD OF THE INVENTION

This invention relates to teaching. More particularly, it relates to a device for efficient and effecting teaching.

This invention relates to the ability to view with transparencies, the function of the entire body and its functions. Individual patients can be monitored in precise real time (as the patients reacts and breathes before you.) Any and Every organ, muscle, artery, vein, nerve stimulus can be captured and calculated. Every cause and effect of motion, medication, brain stimulus and range of movement is monitored. Simulation visualization eyewear allows dimensional viewing of the entire body systems. This is called the cause and effect of body stimulus. A simple example would be, "How does an aspirin or medication effect your body?" or "If this surgical procedure is done, how is your entire body affected?" "Will it cause an additional problem?" If consequences are identified PRIOR to treatment, tremendous amounts of money and/or un-necessary treatments can be avoided.

BACKGROUND

Medicine is the science and practice of establishing the diagnosis, prognosis, treatment, and prevention of disease. Medicine encompasses a variety of health care practices evolved to maintain and restore health by the prevention and treatment of illness. Contemporary medicine applies biomedical sciences, biomedical research, genetics, and medical technology to diagnose, treat, and prevent injury and disease, typically through pharmaceuticals or surgery, but also through therapies as diverse as psychotherapy, external splints and traction, medical devices, biologics, and ionizing radiation, amongst others.

Since the advent of modern science, most medicine has become a combination of art and science (both basic and applied, under the umbrella of medical science). While stitching technique for sutures is an art learned through practice, the knowledge of what happens at the cellular and molecular level in the tissues being stitched arises through science.

Dentistry, also known as dental medicine and oral medicine, is a branch of medicine that consists of the study, diagnosis, prevention, and treatment of diseases, disorders, and conditions of the oral cavity, commonly in the dentition but also the oral mucosa, and of adjacent and related structures and tissues, particularly in the maxillofacial (jaw and facial) area. Although primarily associated with teeth among the general public, the field of dentistry or dental medicine is not limited to teeth but includes other aspects of the craniofacial complex including the temporomandibular joint and other supporting, muscular, lymphatic, nervous, vascular, and anatomical structures.

Educational technology (commonly abbreviated as Edutech, EduTech, or EdTech) is the combined use of computer hardware, software, and educational theory and practice to facilitate learning. Educational technology creates, uses, and manages technological processes and educational resources to help improve user academic performance. The field has been described as a persisting initiative that seeks to bring learners, teachers, and technical means together in an effective way.

One problem that exists with medicine and dentistry is that all learning is either by bookwork or directly working on a patient. However, these methods are flawed in that they don't give direct views of the patient at hand. Although, there are numerous scans, MRIs, and the like that are currently performed, these scans, MRIs and the like are not directly applied to the specific skeletal structure of the patient.

Accordingly, and in light of the foregoing, there is a desire to have a device that is computerized to apply such scans, MRIs and the like to the skeletal view of a patient that the doctor can view in real time and have a full view of the particular patient being examined and/or surgery performed upon. It is further desirable for the doctor to have a method to see the patient's scans in a three-version view and to go back and forth through different levels to understand the specifics of the patient in real time.

BRIEF DESCRIPTION OF THE DRAWINGS

FIG. 1C is an illustrated third view of the computer for providing real-time specific information to a doctor as shown in FIG. 1A.

DETAILED DESCRIPTION

Figure 1A:
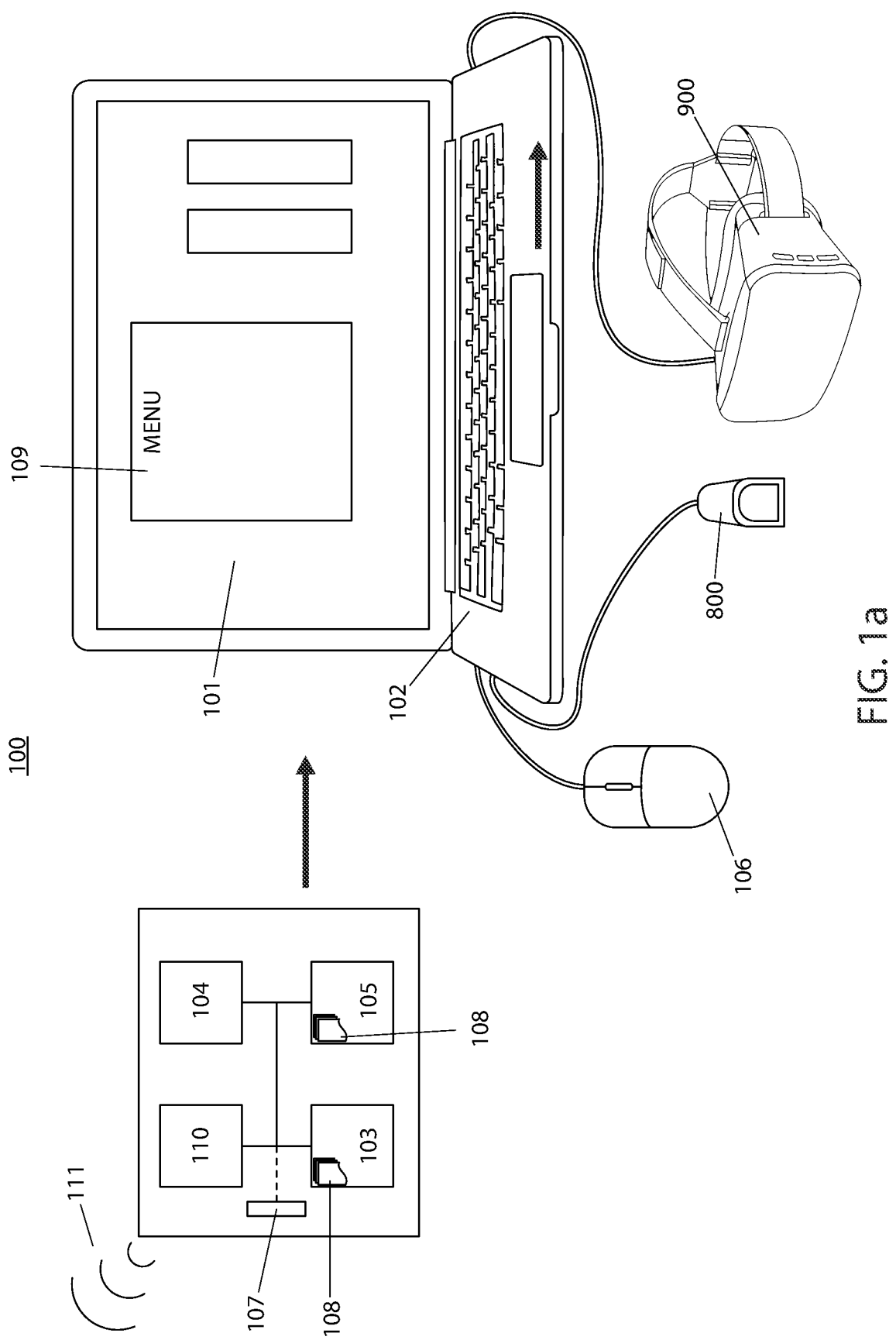
FIG. 1A is an illustrated first view of a computer system for providing real-time specific information to a doctor.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
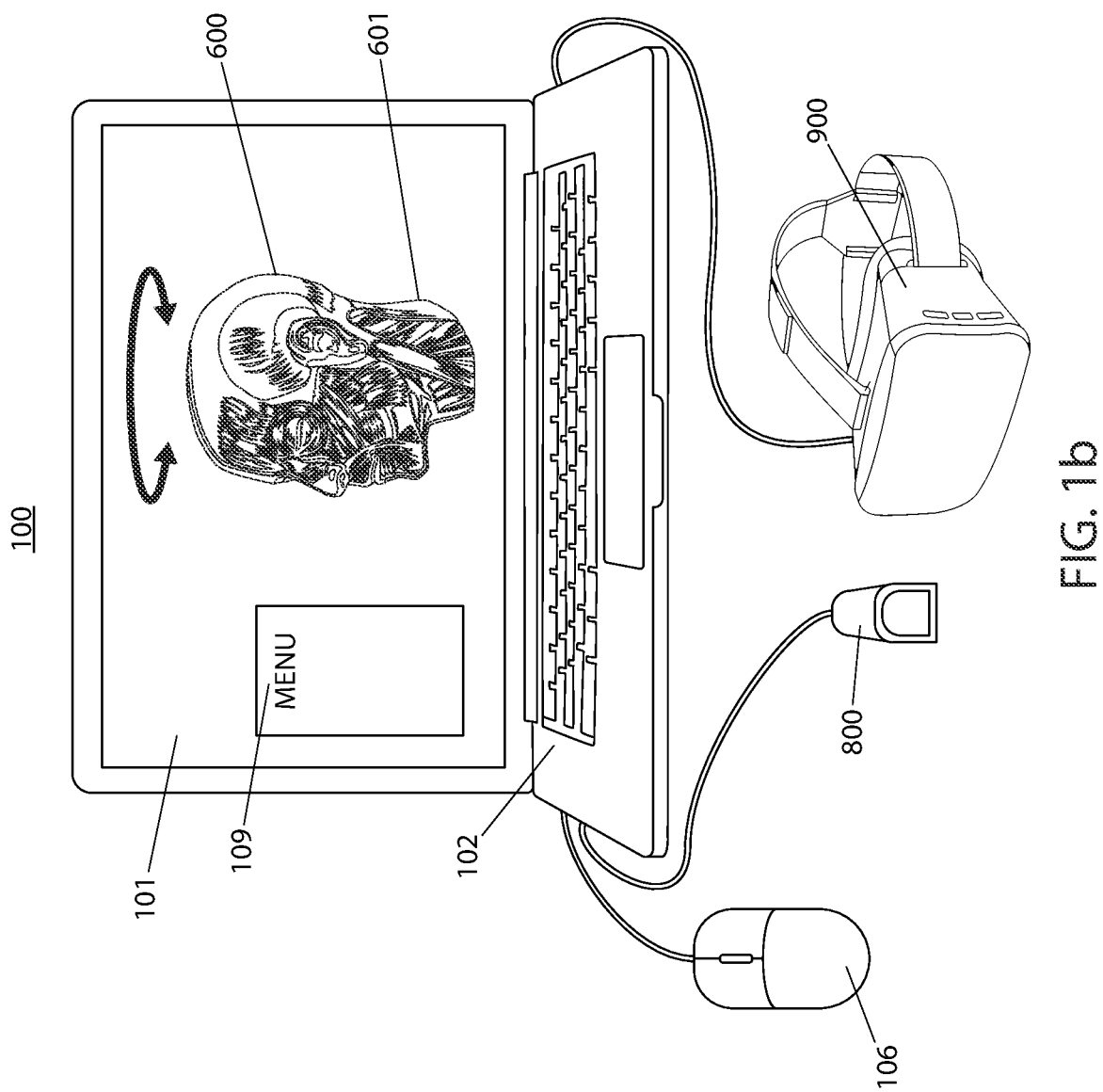
FIG. 1B is an illustrated second view of the computer for providing real-time specific information to a doctor as shown in FIG. 1A.

Referring to FIG. 1A, FIG. 1B and FIG. 1C, are illustrated views of a computer system 100 of an absolute teaching device for providing real-time specific information to a doctor.

The computer system 100 has a display 101, a keyboard 102, a memory 103, a central processing unit (CPU) 104, a hard drive 105, a mouse 106, a wireless communication device 110 and a power source 107.

The power source 107 is preferably a rechargeable battery, however other types of power sources are hereby contemplated, including, but not limited to AC/DC, lithium battery, etc. The power source 107 is electrically coupled to the display 101, the keyboard 102, the memory 103, the central processing unit (CPU) 104, the hard drive 105, the wireless communication device 110 and the mouse 106.

One or more computer programs 108 are configured to be stored in the memory 103 and the hard drive 105. The one or more computer programs 108 are executed on by the CPU 104 and the CPU 104 renders images/icons onto the display 101. The keyboard 102 is configured to enter information by typing and entering which of the computer programs 108 to be executed by the CPU 104. The mouse 106 is further utilized to select the computer program 108 to be executed and to select from a menu 109, a first skeletal image 600 and/or a second skeletal image 700. The other images are preferably a skeleton of a patient, however other images are hereby contemplated, including, but not limited to, skeleton, teeth, muscles, etc. Each of the first skeletal image 600 and second skeletal image 700 may have a highlight 650 that indicates an area of concern or an origin of concern. The first skeletal image 600 and second skeletal image can be expanded for views of a specific area of concern or review.

The computer system 100 further has a virtual reality eyewear 900 and a sensor 800. The sensor 800 is useful for coupling to a patient and to obtain vital information related to the patient at time of examination.

The virtual reality eyewear 900 is useful for having a virtual view of the first skeletal image 600 and/or second skeletal image 700 and seeing virtual views of the first skeletal image 600 and/or second skeletal image 700 to determine a procedural program for the patient or a view of a procedural program to help heal any defect or other issue for the patient.

The computer system 100 further allows for the entry of data, such as, but not limited to, a patient's medical information, such as, but not limited to, teeth x-ray, MRI, CAT scan, etc. The data is stored in the memory 103 of the computer system 100 for use by the computer programs 108 being executed by the CPU 104.

Data may further be uploaded and/or downloaded via wireless signaling 111 through the wireless communication device 110 which is communicatively coupled to the CPU 104.

In FIG. 1B and FIG. 1C, the first skeletal image 600 and the second skeletal image 700 may be manipulated by the user to see the first skeletal image 600 and/or the second skeletal image 700 in either a left/right direction or an up/down direction to have specific views of the first skeletal image 600 and/or second skeletal image 700 to further inspect the first skeletal image 600 and/or second skeletal image 700 from different angles or specific areas.

Figure 2:
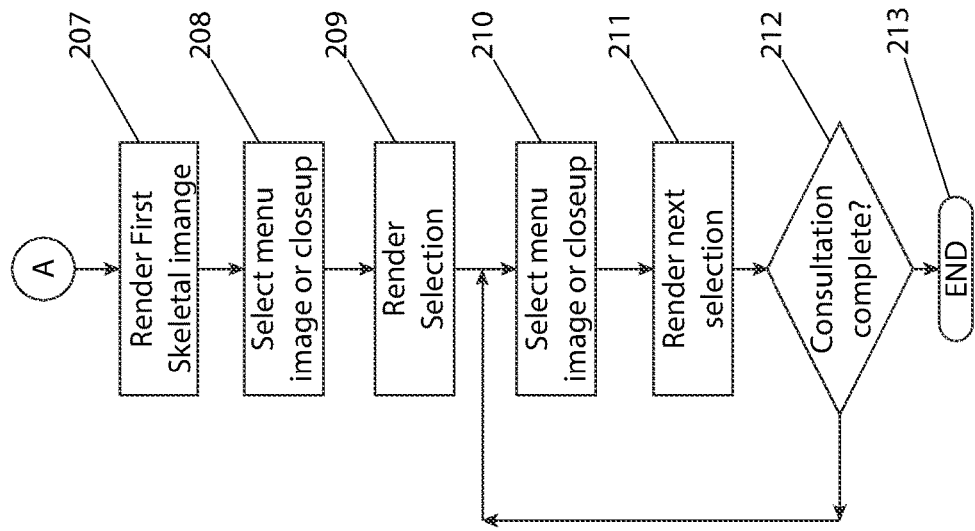
FIG. 2 is an illustrated view of a flowchart for presenting the specific information of the patient to the doctor.
Figure 2:
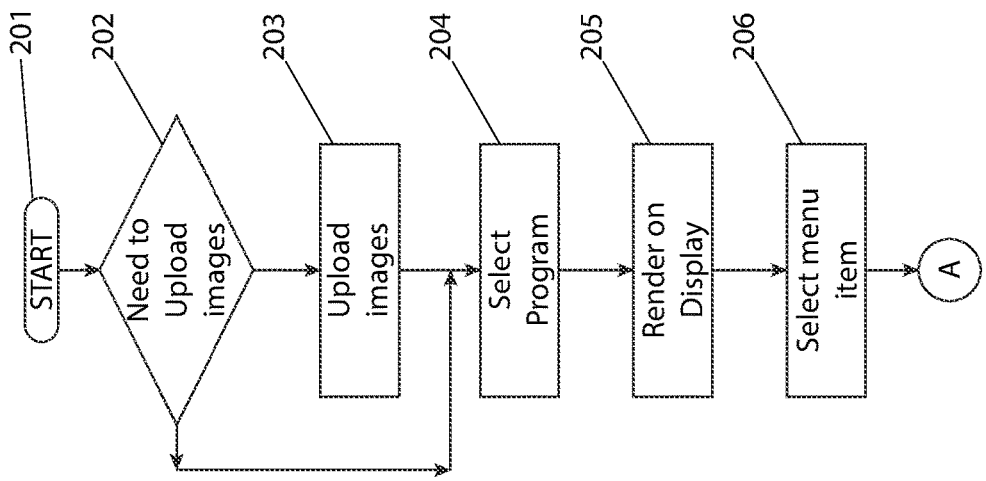

Moving now to FIG. 2, an illustrated view of a flowchart 200 of an absolute teaching device for presenting an image of the patient's medical information to the doctor. The absolute teaching device is useful to aid to educate the patient or to close a mode of a treatment plan. The absolute teaching device removes the blood and gut, that most non-healthcare individuals can be squeamish about, by animating with transparencies to see from frontal to supine. The absolute teaching device may highlight, or glow, for areas of concern during a consultation and direct any other areas of concern related to the origin of concern.

The flowchart 200 starts at 201. At 202, it is determined if patient medical information is desired to be loaded onto the memory 103 or hard drive 105. If it is determined that the patient medical information is necessary to be loaded onto the memory 103 or hard drive 105, the patient's medical information is downloaded into the computer system 100 at 203.

One of the computer programs 108 is selected by use of the mouse 106, at 204, where the CPU 104 is loaded with the selected computer program 108. At 205, the CPU 104 renders a menu 500 to be displayed at the display 101.

At 206, the doctor selects one of the menu items dependent upon the view the doctor wishes to have. At 206, the selected view from the menu, the CPU 104 retrieves the patient information determined by the selected view, and is retrieved from the memory 103 or the hard drive 105.

A first skeletal image 600 is rendered at the display 101 at 207. The doctor may elect to review the displayed first skeletal image 600 or may select, at 208, to view the menu, a second skeletal image 700 a view a specific location of the first skeletal image 600 to display a first detailed area 700 of the first skeletal image 600. The first skeletal image 600 is preferably a neck 601 of the patient. The second image 700 is preferably the mouth/teeth 701 area of the patent. The first skeletal image 600 and second skeletal image 700 may have a highlight 650 that indicates an area of concern or an origin of concern.

Selecting the second skeletal image 700 or the menu 109 when the first skeletal image 600 is being rendered. At 209, rendering the menu or image selected at 208.

At 209, the doctor may elect to return to the menu 500 or the first skeletal image 600 or select a second detailed area 800 for review to determine precise details to teach the patient or close a mode of treatment plan. The second image 700 is preferably the mouth/teeth 701 area of the patent. The skeletal image 700 may have a highlight 650 that indicates an area of concern or an origin of concern.

At 210, selecting the first skeletal image 600 or the menu 209 when the second skeletal image 700 is being rendered. At 211, is rendering the menu or image selected at 209.

At 212, determining whether the consultation has ended, if it has not then return to 210 to select an image, a closeup or the menu. If it is determined that the consultation has ended at 212, then the flowchart 200 ends at 213.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for an absolute teaching device, the method comprising:
   determining whether a patient information of a patient requires an update;
   if the patent information of the patient requires the update, download patient medical information to a memory in a computer;
   selecting a computer program, the computer program being executed by a CPU;
   rending a menu on a display;
   selecting a first skeletal image from the menu;
   determining the selected first skeletal image, wherein the CPU render the first skeletal image on the display;
   selecting a portion of the rendered first skeletal image, wherein the selection portion being rendered in detail;
   selecting a second skeletal image from the menu, wherein the CPU rendering a second skeleton to the display;
   a virtual reality eyewear, the virtual reality eyewear being coupled to the computer, wherein the virtual reality eyewear for virtually scanning the first skeletal image and virtually scanning the second skeletal image to determine a procedural program for a patient;
   a sensor, the sensor being coupled to the computer, wherein the sensor being for obtaining vital information from the patient; and
   wherein the second skeletal image having a highlighted portion.

2. The method of claim 1, wherein the first skeletal image having a highlight.

3. The method of claim 2, wherein the highlight being a flashing light.

4. The method of claim 1, wherein the second skeletal image having a highlight.

5. The method of claim 4, wherein the highlight being a glowing light.

6. The method of claim 1, wherein the method further comprising: selecting a portion of the first skeletal image to be shown in depth.

7. The method of claim 1, wherein the method further comprising: selecting a portion of the second skeletal image to be shown in depth.

8. The method of claim 1, wherein the first skeletal image being a neck of the patient.

9. The method of claim 1, wherein the second skeletal image being a mouth of the patent.

10. The method of claim 1, wherein the second skeletal image being teeth of the patient.

11. The method of claim 1, wherein the method further comprising: selecting from the menu when rendering the first skeletal image.

12. The method of claim 1, wherein the method further comprising: selecting the second skeletal image when rendering the first skeletal image.

13. The method of claim 1, wherein the method further comprising: selecting from the menu when rendering the second skeletal image.

14. The method of claim 1, wherein the method further comprising: selecting the first skeletal image when rendering the second skeletal image.

* * * * *